(12) United States Patent
Wang et al.

(10) Patent No.: US 12,031,887 B2
(45) Date of Patent: Jul. 9, 2024

(54) FIELD AGRICULTURAL MACHINERY TEST PLATFORM

(71) Applicant: South China Agricultural University, Guangzhou (CN)

(72) Inventors: Zaiman Wang, Guangzhou (CN); Minghua Zhang, Guangzhou (CN); Xiwen Luo, Guangzhou (CN); Peng Xu, Guangzhou (CN); Ying Zang, Guangzhou (CN); Wenwu Yang, Guangzhou (CN); Shuncai Liu, Guangzhou (CN); Miao Su, Guangzhou (CN); Juan Pei, Guangzhou (CN); Siyu He, Guangzhou (CN); Yangqing Ye, Guangzhou (CN)

(73) Assignee: South China Agricultural University, Guangzhou (CN)

( * ) Notice: Subject to any disclaimer, the term of this patent is extended or adjusted under 35 U.S.C. 154(b) by 335 days.

(21) Appl. No.: 17/623,305

(22) PCT Filed: Nov. 7, 2019

(86) PCT No.: PCT/CN2019/116404
§ 371 (c)(1),
(2) Date: Dec. 28, 2021

(87) PCT Pub. No.: WO2020/258645
PCT Pub. Date: Dec. 30, 2020

(65) Prior Publication Data
US 2022/0373433 A1 Nov. 24, 2022

(30) Foreign Application Priority Data
Jun. 28, 2019 (CN) .......................... 201910572381.3

(51) Int. Cl.
*G01M 99/00* (2011.01)
*A01B 76/00* (2006.01)
(Continued)

(52) U.S. Cl.
CPC ......... *G01M 99/008* (2013.01); *B60T 17/223* (2013.01); *G01L 5/16* (2013.01);
(Continued)

(58) Field of Classification Search
CPC ............ G01M 99/008; G01M 99/005; G01M 17/0074; G01M 17/007; G01M 17/0072;
(Continued)

(56) References Cited

U.S. PATENT DOCUMENTS

2022/0373433 A1* 11/2022 Wang .................. G01M 99/004

FOREIGN PATENT DOCUMENTS

| CN | 104316300 A | * | 1/2015 |
| CN | 104316300 A | | 1/2015 |

(Continued)

OTHER PUBLICATIONS

International Search Report dated Mar. 26, 2020, Application No. PCT/CN2019/116404.

*Primary Examiner* — Stephanie E Bloss
*Assistant Examiner* — Kevin C Butler
(74) *Attorney, Agent, or Firm* — The Dobrusin Law Firm, PC

(57) ABSTRACT

A field agricultural machinery test platform, comprising a field soil groove, traveling guide rails, traveling trolleys, a hitch trolley, a hitch device mechanism, and a test system. The two guide rails are provided on both sides of the field soil groove in parallel, and the traveling trolleys are located on the guide rails; a cross beam is provided between the two guide rails, and the two ends of the cross beam are respectively connected to the traveling trolleys; the hitch trolley is
(Continued)

provided on the cross beam, and a hitch device is provided on the hitch trolley; the test system is provided on the hitch trolley and the hitch device; a test machine is connected to the hitch device; the test system comprises an image assembly, a force test assembly, and a control assembly which are mounted on the hitch trolley.

7 Claims, 2 Drawing Sheets

(51) Int. Cl.
 B60T 17/22 (2006.01)
 G01L 5/16 (2020.01)
 G01M 13/027 (2019.01)
 G01M 17/007 (2006.01)

(52) U.S. Cl.
 CPC ........ *G01M 13/027* (2013.01); *G01M 17/007* (2013.01); *G01M 17/0072* (2013.01); *G01M 17/0074* (2013.01); *G01M 99/005* (2013.01); *A01B 76/00* (2013.01)

(58) Field of Classification Search
 CPC ........ G01M 13/027; G01L 5/16; A01B 76/00; B60T 17/223
 USPC ...................................................... 73/118.01
 See application file for complete search history.

(56) References Cited

FOREIGN PATENT DOCUMENTS

| | | | | | |
|---|---|---|---|---|---|
| CN | 106053046 | A | * | 10/2016 | ............ G01M 13/00 |
| CN | 205843860 | U | * | 12/2016 | |
| CN | 205981631 | U | * | 2/2017 | |
| CN | 103033372 | B | * | 3/2017 | |
| CN | 108332984 | A | * | 7/2018 | .......... G01M 99/005 |
| CN | 108332984 | A | | 7/2018 | |
| CN | 207911319 | U | * | 9/2018 | |
| CN | 207991836 | U | * | 10/2018 | |
| CN | 207991836 | U | | 10/2018 | |
| CN | 108918006 | A | * | 11/2018 | ............ G01L 5/0076 |
| CN | 109406172 | A | * | 3/2019 | .......... G01M 17/013 |
| CN | 109406172 | A | | 3/2019 | |
| CN | 110220687 | A | * | 9/2019 | ............... G01L 5/16 |
| CN | 110220687 | A | | 9/2019 | |
| CN | 112067328 | A | * | 12/2020 | ............ G01M 99/00 |
| JP | 2016095661 | A | * | 5/2016 | ............. A01B 69/00 |
| JP | 6724567 | B2 | * | 7/2020 | |
| JP | 6752024 | B2 | * | 9/2020 | ............... B60R 1/00 |
| KR | 101658895 | B1 | * | 9/2016 | ............ B62D 55/00 |
| KR | 101658895 | B1 | | 9/2016 | |

* cited by examiner

FIELD AGRICULTURAL MACHINERY TEST PLATFORM

FIELD OF THE INVENTION

The present invention belongs to the technical field of agricultural machinery, and in particular relates to a field agricultural machinery test platform.

BACKGROUND OF THE INVENTION

The field agricultural machinery test platform is an effective device for testing field machinery, and can provide accurate and effective data for the research and development of new agricultural machinery and the test of performance parameters. It is of great significance for exploring the working mechanism of key members used in soil tillage, sowing, harvesting and the like, providing a method for separating materials and soil, reducing rent and consumption, simplifying structure, saving costs, etc. The field agricultural machinery test platform is mainly used for experimental research and performance test of the whole machine or working members of the machinery used for tillage, sowing, transplanting, leveling, plant protection, etc. It can collect performance or state parameters such as working speed, working resistance, six-component force, rotational speed, torque, and tillage depth (as well as sowing depth and fertilization depth), and process the data in real time. Compared with field tests, this platform has the advantages of having controllable conditions, a larger effective working width, and a shorter research period. The existing field agricultural machinery test platforms can be basically divided into the following two types: one is that the test platform moves, while a test member is relatively fixed; and the other is that the test platform does not move, while the test member moves in a certain direction. These two platforms are mostly small indoor test platforms at this stage, and have the following shortcomings: first, the indoor test environment is not real enough, which increases the error; second, the two platforms are both small test platforms, not suitable for testing large agricultural machinery, and they are both low in the test accuracy. Therefore, an outdoor field agricultural machinery test platform with higher accuracy and better versatility is required.

CONTENTS OF THE INVENTION

To solve the above problems, the present invention provides a field agricultural machinery test platform; the platform is suitable for testing most large and medium-sized agricultural machinery, and can test the performance of planting machinery by simulating field conditions; it is installed outdoors and has higher test accuracy.

The field agricultural machinery test platform comprises a field soil groove, traveling guide rails, traveling trolleys, a hitch trolley, a hitch mechanism, and a test system; the two guide rails are provided on both sides of the field soil groove in parallel, and the traveling trolleys are located on the guide rails; the traveling trolley comprises a cross beam and a trolley drive portion, wherein the cross beam is provided between the two guide rails, and the two ends of the cross beam are respectively connected to the trolley drive portion on both sides thereof; the hitch trolley is provided on the cross beam, and a hitch mechanism is provided on the hitch trolley; the test system is provided on the hitch trolley and the hitch mechanism; a test machine is connected to the hitch mechanism; the test system comprises an image assembly, a force test assembly, and a control assembly that are mounted on the hitch trolley; the image assembly and the force test assembly are electrically connected to the control assembly.

Preferably, the hitch trolley comprises a motor, a rail pulley, a side auxiliary pulley, and a panel; two pairs of the rail pulleys are symmetrically arranged on both sides of the panel, and one of the rail pulleys has its transmission shaft connected with the motor; and the side auxiliary pulley is arranged on the outer side the rail pulley.

Preferably, the hitch mechanism is a three-point suspension device, which is connected with a hydraulic lifting member and fixed on a front-rear plate arranged on the panel; the three-point suspension device comprises an upper lifting portion and a lower lifting portion that are both arranged on the front-rear plate, with the lower lifting portion symmetrically arranged on both sides of the upper lifting portion; and the test machine realizes three-point suspension through the upper lifting portion and the lower lifting portion.

Preferably, a fine-adjusting device is arranged on the front-rear plate, and connected with the three-point suspension device; and a balance weight for balancing the hitch test machine is provided on the front side of the panel of the hitch trolley.

Preferably, a force test assembly, including a sensor, takes the direction of the guide rail as a Y-axis direction, the direction of the cross beam as an X-axis direction, and the vertical up-and-down lifting direction as a Z-axis direction; two X-axis tension pressure sensors are symmetrically arranged on the left and right sidewalls of the panel in the direction of the cross beam; two Y-axis tension pressure sensors are symmetrically arranged on the front and rear sidewalls of the panel in the direction of the guide rail; and two Z-axis tension pressure sensors are symmetrically arranged up and down on the lifting arm.

Preferably, the image assembly is a high-speed camera and mounted on the hitch trolley.

Preferably, a foundation beam, having its outer surface covered with a foam sandwich panel, is laid in the field and encloses an open-air rectangular test field block; the field soil grooves are arranged in parallel in the test field block, with a buffer region in front and rear of them.

Preferably, the guide rail is provided with a buffer limiter at the head end and tail end thereof.

Preferably, the trolley drive portion comprises wheels, a frame, a drive device, a transmission mechanism, and a braking mechanism, the frame being provided front and rear on both sides with four wheels altogether; the drive device is connected with the wheels through the transmission mechanism, and the braking mechanism is connected with the wheels, with a power mechanism transmitting power to the wheels through the transmission mechanism.

Preferably, the transmission mechanism comprises a reducer and a sprocket assembly; the sprocket assembly comprises a sprocket shaft, a chain and sprocket teeth, the sprocket teeth being arranged on the sprocket shaft and meshed with the chain; the drive device is connected with the reducer through a belt, and the reducer is connected with the sprocket shaft under a seat, thereby driving the sprocket teeth to rotate; the chain is connected with the sprocket teeth and the wheels, so as to output power to the wheels through the chain and then drive the wheels to rotate.

The present invention has the following advantages: The field agricultural machinery test platform sets a fixed soil groove field block, sets up a hitch trolley on a traveling trolley, and hitches the tested machine or small complete machine by hitching the three-point suspension device at the rear end of the trolley, such that it can more realistically simulate the state of a tractor running and working in the field with the machine hitched thereto, the tractor towing and driving the tested machine to move along the field soil groove at the same time; besides, this platform transmits the obtained data to the control assembly through the force test assembly and the image assembly for integrated processing, so as to combine the three functions of traveling, testing and data processing and more accurately obtain the field test data of the large and medium-sized machinery; in addition, the field agricultural machinery test platform of the present invention has a reasonable structure design and is designed to be used outdoors, so the test effect is more accurate and the operation range is wider.

Figure 1:
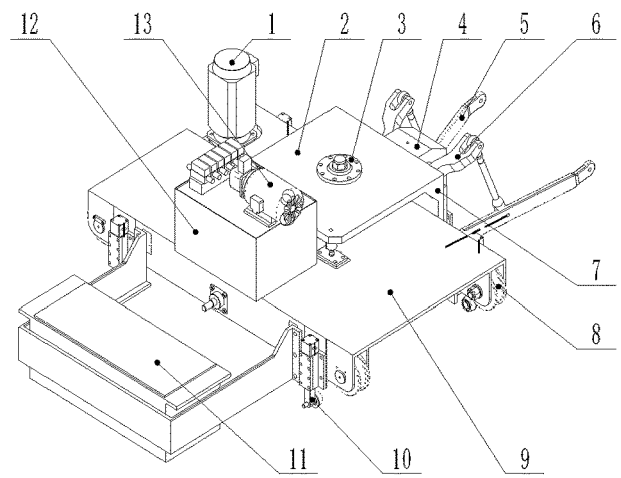
FIG. 1 is a schematic diagram of a hitch trolley according to an example of the present invention.
Figure 2:
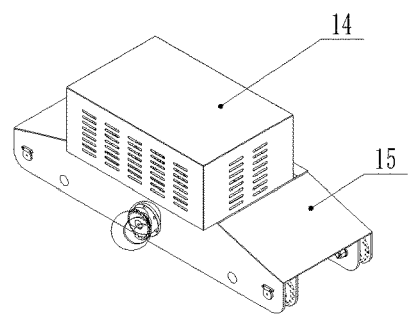
FIG. 2 is an axonometric drawing of a trolley drive portion according to an example of the present invention.
Figure 3:
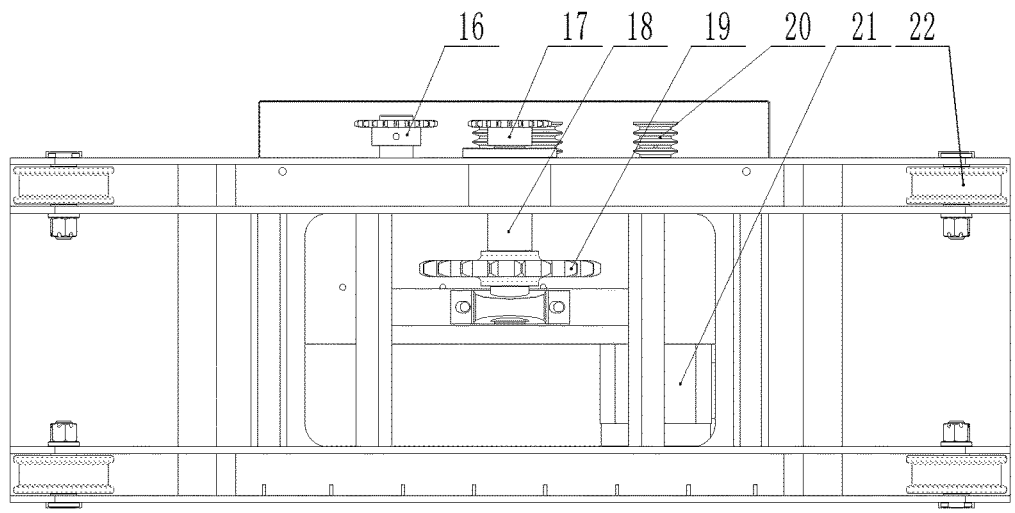
FIG. 3 is a schematic bottom view of the trolley drive portion according to an example of the present invention.
Figure 4:
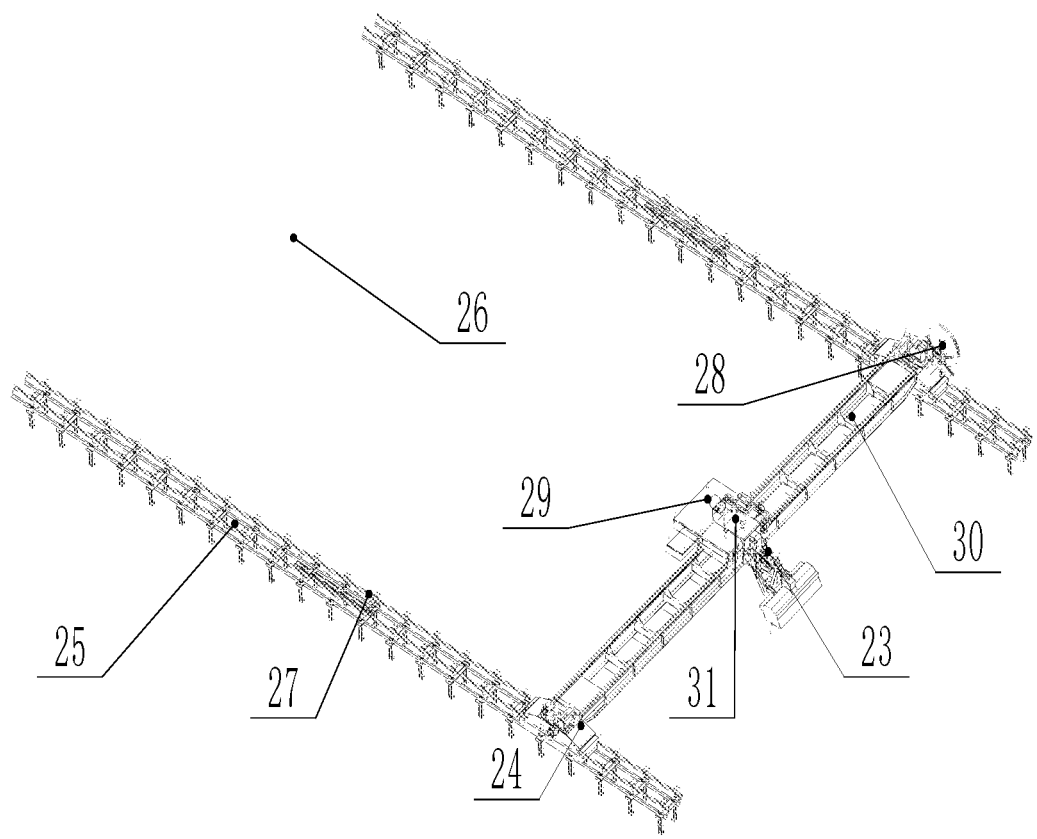
FIG. 4 is a schematic diagram of the overall structure according to an example of the present invention.
Figure 5:
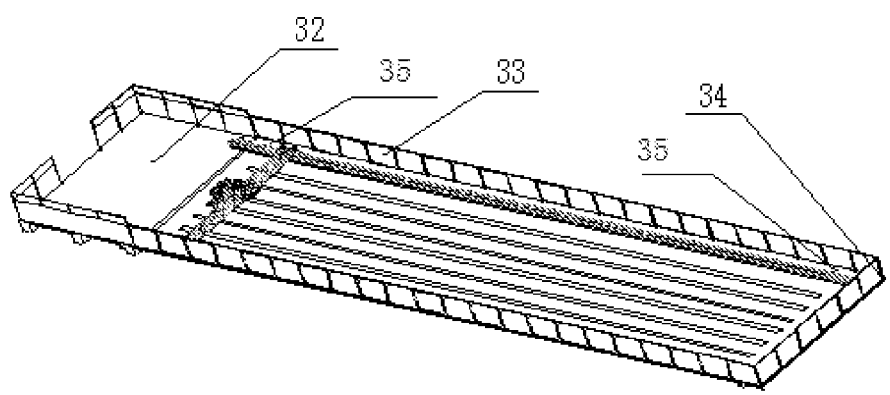
FIG. 5 is a schematic side view according to an example of the present invention with a workroom.

In the figures: 1. motor; 2. front plate; 3. fine-adjusting device; 4. connector; 5. connecting rod; 6. lifting arm; 7. rear plate; 8. rail pulley; 9. panel; 10. side auxiliary pulley; 11. balance weight; 12. hydraulic oil tank; 13. hydraulic pump; 14. seat shield; 15. seat; 16. transmission shaft; 17. reducer; 18. sprocket shaft; 19. sprocket teeth; 20. motor pulley; 21. drive device; 22. wheel; 23. test machine; 24. traveling trolley; 25. guide rail; 26. field soil groove; 27. chain; 28. cable reel; 29. hitch trolley; 30. cross beam; 31. test system; 32. workroom; 33. foam sandwich panel; 34. foundation beam; and 35. water outlet.

DETAILED DESCRIPTION OF THE EMBODIMENTS

The present invention will be further described below with reference to drawings.

A field agricultural machinery test platform is provided, comprising a field soil groove, traveling guide rails, traveling trolleys, a hitch trolley, a hitch mechanism, and a test system. The field soil groove, in a rectangular shape, is an outdoor field for actual crop planting. The two guide rails are provided on both sides of the field soil groove in parallel, and the traveling trolleys are located on the guide rails. The traveling trolley comprises a cross beam and a trolley drive portion; the cross beam, provided between the two guide rails, has its two ends respectively connected to the trolley drive portion, and moves in the direction of the guide rail through the sliding of the two trolley drive portions on the guide rail. The hitch trolley, arranged on the cross beam, moves along the cross beam, and also moves in the direction of the guide rail with the cross beam. A hitch mechanism is provided on the hitch trolley, the test system is provided on the hitch trolley and the hitch mechanism, and a test machine is connected to the hitch mechanism; thereby, the traveling test of the test machine in the field is realized through the hitch trolley and the traveling trolley, and the data in the process of traveling test are collected and processed through the test system, so as to realize the field agricultural test of the test machine.

In this example, a workroom is provided in the non-rail test region. A buffer region is provided in front and rear of the field soil groove.

In this example, the field soil groove is an open-air rectangular soil groove. A foundation beam, having its outer surface covered with a foam sandwich panel, is laid in the field and encloses an open-air rectangular test field block; and the field soil grooves are arranged in parallel in the test field block. The field soil groove is 80 m long and 20 m wide. A buffer region is provided in front and rear of the field soil groove. Actual field planting soil is used in the field soil groove. The soil has some advantages, such as a low content of organic matter, which prevents microbial growth and spoilage; besides, the soil also overcomes the shortcomings of the previous field test, such as a small working space, low efficiency and poor repeatability; in addition, it further improves and enhances the degree of simulation of field soil and the state of a tractor running and working in the field with the machine hitched thereto. The field soil groove is provided with a water inlet on one side and a water outlet; a water inlet device, which can be a water pump, is in communication with the water inlet as well as a ditch on the side of the field soil groove, so as to draw water from the ditch to supply to the field soil groove; the water outlet, arranged on both sides of the field soil groove, is in communication with a drainage facility, which is a water pump in this example, so that the water in the field soil groove can be discharged by the drainage facility via the water outlet. Therefore, through the design of the water inlet and outlet, the water content of the soil in the field soil groove can be adjusted to ensure the strength, cohesion and adhesion of the soil required by the test conditions, and the soil properties of the simulated paddy field or dry field required by the test can be easily adjusted.

In this example, the guide rails, symmetrically located on the left and right sides of the field soil groove, are laid on the reinforced concrete structure. A buffer limiter, provided at the head end and tail end of the guide rail, can prevent the traveling trolley from derailing when it travels to the limit position, thereby avoiding accidents. The total length of each guide rail is more than 70 m, the width of the unilateral guide rail platform is greater than or equal to 2 m, and the total load bearing of the guide rail is more than 10 t, which meet the normal working requirements of the moving hitch trolley, with a self-testing function provided. The traveling trolley starts from the buffer region at the head end, and slowly increases the speed to the working speed required for the field test; when the traveling trolley reaches the expected speed and other parameters, the sensors connected to the traveling trolley will collect data at the same time.

In this example, the trolley drive portion, adopting a four-wheel drive design, comprises wheels, a frame, a drive device, a transmission mechanism, and a braking mechanism. The frame is provided front and rear on both sides with four wheels altogether, the drive device is connected with the wheels through the transmission mechanism, and the braking mechanism is connected with the wheels. A power mechanism transmits power to the wheels through the transmission mechanism, so that the wheels move to drive the movement of the overall frame.

Further, the drive device is a variable-frequency adjustable-speed bidirectional servo motor, which is transmitted into the reducer through a belt; and the reducer is designed to be of stepless variable speed, so as to achieve the rotational speed and working speed required by various test conditions as far as possible. With the variable-frequency adjustment of the variable-frequency adjustable-speed bidirectional servo motor, the stepless variable speed can be achieved between the low and high gears. Moreover, due to the variable-speed effect of the gearbox, when the speed becomes lower, the corresponding torque will increase; therefore, the transmission shaft diameter of the gearbox will increase as the speed changes from high to low, and the modulus of the gear will also increase accordingly.

The transmission mechanism comprises a reducer and a sprocket assembly; the sprocket assembly comprises a sprocket shaft, a chain and sprocket teeth, the sprocket teeth being arranged on the sprocket shaft and meshed with the chain. The drive device is connected with the reducer through a belt, so as to transmit power to drive the reducer to work; the reducer, connected with the sprocket assembly, has its transmission shaft transmitting the force to the sprocket shaft under the seat, thereby driving the sprocket teeth to rotate; the chain is connected with the sprocket teeth and the wheels, so as to output power to the wheels through the chain and then drive the wheels to rotate; in this way, the traveling trolley can be driven to move in the direction of the guide rail in the field soil groove.

The braking mechanism adopts an electromagnetic brake. Through the release and clamping of the brake, the safety of the traveling trolley during work can be guaranteed. The traveling trolley needs to be able to be braked at any time during operation. Because the large-scale outdoor field agricultural machinery test platform is frequently used and does not travel at a constant speed for a short distance, the selected brake must be simple in structure, easy to install and maintain, quick to replace, and easy to adjust after the corresponding accessories are worn out, safe and reliable.

In this example, the hitch trolley comprises a motor, a rail pulley, a side auxiliary pulley, and a panel; two pairs of the rail pulleys are symmetrically arranged on both sides of the panel, and one of the rail pulleys has its transmission shaft connected with the motor, such that the motor drives the rail pulley to roll, and then the hitch trolley moves on the rail of the cross beam through the four rail pulleys. The side auxiliary pulley is arranged on the outer side of the rail pulley as a power support, which can help to balance the hitch trolley and the movement offset of the hitch trolley, thereby improving the bearing capacity and safety factor of the hitch trolley.

The hitch trolley is provided with a hitch mechanism on the rear side, and a balance weight on the front side of the panel to balance the hitch machine.

The hitch mechanism is a three-point suspension device, and is connected with a hydraulic lifting member; the three-point suspension device comprises an upper lifting portion and a lower lifting portion that are both arranged on the front-rear plate, with the lower lifting portion symmetrically arranged on both sides of the upper lifting portion; and the test machine realizes three-point suspension through the upper lifting portion and the lower lifting portion.

The upper lifting portion comprises a lifting shaft, a lifting arm, a lifting rod, and a pull-down rod. The lifting shaft is fixed on the rear plate of the front-rear plate; the lifting arm has one end fixedly connected with the lifting shaft, and the other end hinged with the upper end of the lifting rod; the pull-down rod is fixed on the rear plate of the front-rear plate, and hinged with the lower end of the lifting rod. The lower lifting portion includes a pull-up rod, which is fixed on the rear plate of the front-rear plate.

A hydraulic lifting member comprises a hydraulic oil tank installed on the panel, and a hydraulic pump arranged on the hydraulic oil tank. The test machine suspended by the three-point suspension device can be raised or lowered by means of the hydraulic pump and hydraulic oil tank.

The three-point suspension device comprises a connecting rod, a lifting arm and a connector; the connecting rod and the lifting arm are connected with the connector fixed on the rear plate of the front-rear plate, with the front-rear plate installed on the panel. The connector is movably connected with the test machine. Further, the three-point suspension device also includes a hydraulic lifting member, which comprises a hydraulic oil tank installed on the panel, and a hydraulic pump arranged on the hydraulic oil tank. The test machine of the three-point suspension device can be raised or lowered by means of the hydraulic pump. A fine-adjusting device is arranged on the front plate of the front-rear plate. The fine-adjusting device is similar in principle to a balance: once the front side of the plate is lifted by the hydraulic lifting member, the corresponding other side will drop, and the same is true for the left and right sides. Thus, the fine adjustment of the pitch and roll of the test machine within 10° is completed. The fine-adjusting device is connected with the three-point suspension device.

The fine-adjusting device comprises a floating joint and a support adjustment mechanism. The front plate has its rear side installed on the hitch trolley through the support adjustment mechanism, and its front side connected with the floating joint connected to the hydraulic lifting member; the up and down movement of the joint is driven by the floating of the hydraulic member, so as to drive the front-rear plate to move up and down; in addition, through the cooperation of the support adjustment mechanism, the front-rear plate can be finely adjusted up, down, left and right; then, the fine adjustment of the hitch trolley is realized, thereby achieving the fine adjustment of the hitch assembly connected with the hitch trolley. The support adjustment mechanism comprises a ball sleeve, a ball sleeve shaft, a ball sleeve shaft base, a spherical upper cover, and a spherical lower cover. With the ball sleeve being spherical, the outer diameter of the ball sleeve is slightly larger than the inner diameter of the circular hole of the front plate. The lower end of the ball sleeve shaft is installed on the panel of the hitch trolley through the ball sleeve shaft base; the ball sleeve is sleeved on the ball sleeve shaft and passes through the circular hole of the front plate, and the ball sleeve is clamped on the front plate through the circular hole; the spherical upper cover and the spherical lower cover are respectively arranged above and below the front plate, wherein the spherical upper cover is sleeved on the upper part of the ball sleeve, and the spherical lower cover is sleeved on the lower part of the ball sleeve.

The test system comprises an image assembly, a force test assembly, and a control assembly that are mounted on the hitch trolley; the image assembly and the force test assembly are electrically connected to the control assembly. The control assembly can be a PLC of the 6ES7214-1AD23-0XB8 model.

The image assembly is a high-speed camera and mounted on the hitch trolley. Two or more webcams can be connected to the camera; the webcams have a sensor of C-MOS in the size of 5.12×5.12 mm; the shooting speed is 500 FPS, and the recordable duration is longer than or equal to 30 min when the resolution reaches 512×512; the recorded content is stored to an SSD (solid state drive) that comes with the system (the capacity of the SSD is greater than or equal to 512 G); the operating software supports the Chinese system, and allows operation through the hand-held touch screen; the driving time of the built-in power supply is longer than or equal to 70 min; the webcam, smaller than or equal to 35×35×34 mm in size, adopts two recording modes, namely speed priority mode (data is directly stored in the memory of 4 GB, with the highest frame rate) and time priority mode (data is transferred to the SSD, with the longest shooting time); during the field test, the data measured by the hitched test machine or sensors can be collected, displayed, stored, and saved to the system for later playback and data analysis and processing.

A force test assembly, including a sensor, takes the direction of the guide rail as a Y-axis direction, the direction of the cross beam as an X-axis direction, and the vertical up-and-down lifting direction as a Z-axis direction. A group of the sensors comprises two X-axis tension pressure sensors arranged in the direction of the cross beam, two Y-axis tension pressure sensors arranged in the pulling direction, and two Z-axis tension pressure sensors arranged in the vertical direction. The two X-axis tension pressure sensors are symmetrically arranged on the left and right sidewalls of the panel in the direction of the cross beam; the two Y-axis tension pressure sensors are symmetrically arranged on the front and rear sidewalls of the panel in the direction of the guide rail; and the two Z-axis tension pressure sensors are symmetrically arranged up and down on the lifting arm of the lower lifting portion.

Through moving the high-speed camera, sensor and control assembly, the data measured in various field tests can be collected, displayed, and stored, and automatically saved, played back, analyzed and processed by shooting live videos.

The power output mechanism consists of two parts: one is the X-axis power output part that drives the hitch trolley to move left and right, and the other is the Y-axis power output part that drives the entire cross beam and hitch trolley to move forward and backward. The X-axis power output part comprises a variable-frequency adjustable-speed bidirectional servo motor, a rail pulley, and a side auxiliary pulley; the variable-frequency adjustable-speed bidirectional servo motor transmits the output power to the transmission shaft of one of the four rail pulleys, so that the rail pulley acts as a driving wheel to drive the other driven wheels to move left and right on the cross beam; besides, the side auxiliary pulley is arranged on the four rail pulleys as a power support, which can help to balance the hitch trolley and the movement offset, thereby improving the bearing capacity and safety factor. The Y-axis power output part includes a variable-frequency adjustable-speed bidirectional motor, which drives the transmission shaft of the gearbox through a belt; the output power is transmitted by the gearbox to the sprocket teeth on the gear shaft through the torque speed sensor, and the sprocket teeth cooperate with the chain to transmit the power to the entire traveling trolley, there being one chain on each side, thus ensuring the smoothness and synchronism of the working members. A cable reel works together with the variable-frequency adjustable-speed bidirectional motor, and moves with the traveling trolley and hitch trolley, providing power supply, control power supply and control signals for the entire moving equipment.

The field agricultural machinery test platform can accurately measure parameters such as the soil resistance or trolley traction in the forward direction (Y direction), the resultant force of the machine gravity (Z direction) and the soil reaction force, and the soil lateral (X direction) reaction force through field tests; according to the distance between the tension pressure sensors and the force measured by each sensor, after receiving the data of each sensor, the control assembly can calculate the component force and torque acting on the X, Y and Z axes of the machine through the simple four arithmetic formulas; therefore, the measurement of mechanical parameters is realized, and the preparation work of attaching strain gauges to the tested machine before the test required by the traditional force measuring device is avoided, which is convenient for changing the machine.

The above-mentioned examples are preferred embodiments of the present invention; however, the embodiments of the present invention are not limited thereto, and any other alterations, modifications, replacements, combinations and simplifications that are made without departing from the spirit and principle of the present invention shall be equivalent substitutions and within the protection scope of the present invention.

The invention claimed is:

1. A field agricultural machinery test platform, comprising a field soil groove, two guide rails, a traveling trolley, a hitch trolley, a hitch mechanism, and a test system;
   the two guide rails are provided on both sides of the field soil groove in parallel, and the traveling trolleys are located on the guide rails;
   the traveling trolley comprises a cross beam and a trolley drive portion, wherein the cross beam is provided between the two guide rails, and the two ends of the cross beam are respectively connected to the trolley drive portion on both sides thereof;
   the hitch trolley is provided on the cross beam, and the hitch mechanism is provided on the hitch trolley, wherein the hitch trolley comprises a motor, a rail pulley, a side auxiliary pulley, and a panel, and wherein two pairs of the rail pulleys are symmetrically arranged on both sides of the panel, and one of the rail pulleys has a transmission shaft connected with the motor; and the side auxiliary pulley is arranged on the outer side the rail pulley;
   the test system is provided on the hitch trolley and the hitch mechanism; a test machine is connected to the hitch mechanism;
   the test system comprises an image assembly, a force test assembly, and a control assembly that are mounted on the hitch trolley;
   the image assembly and the force test assembly are electrically connected to the control assembly;
   wherein the hitch mechanism is a three-point suspension device, which is connected with a hydraulic lifting member and fixed on a front-rear plate arranged on the panel; and
   wherein the three-point suspension device comprises an upper lifting portion and a lower lifting portion that are both arranged on the front-rear plate, with the lower lifting portion symmetrically arranged on both sides of the upper lifting portion; and the test machine realizes three-point suspension through the upper lifting portion and the lower lifting portion; and
   wherein a fine-adjusting device is arranged on the front-rear plate and connected with the three-point suspension device; and
   wherein a balance weight for balancing the hitch test machine is provided on the front side of the panel of the hitch trolley.

2. The field agricultural machinery test platform according to claim 1, wherein: a force test assembly, including a sensor, takes the direction of the guide rail as a Y-axis direction, the direction of the cross beam as an X-axis direction, and the vertical up-and-down lifting direction as a Z-axis direction; two X-axis tension pressure sensors are symmetrically arranged on the left and right sidewalls of the panel in the direction of the cross beam; two Y-axis tension pressure sensors are symmetrically arranged on the front and rear sidewalls of the panel in the direction of the guide rail; and two Z-axis tension pressure sensors are symmetrically arranged up and down on a lifting arm of the lower lifting portion.

3. The field agricultural machinery test platform according to claim 1, wherein: the image assembly is a high-speed camera and mounted on the hitch trolley.

4. The field agricultural machinery test platform according to claim 1, wherein: a foundation beam, having its outer surface covered with a foam sandwich panel, is laid in the field and encloses an open-air rectangular test field block; the field soil grooves are arranged in parallel in the test field block, with a buffer region in front and rear of them.

5. The field agricultural machinery test platform according to claim 1, wherein: the guide rail is provided with a buffer limiter at the head end and tail end thereof.

6. The field agricultural machinery test platform according to claim 1, wherein: the trolley drive portion comprises wheels, a frame, a drive device, a transmission mechanism, and a braking mechanism, the frame being provided front and rear on both sides with four wheels altogether; the drive device is connected with the wheels through the transmission mechanism, and the braking mechanism is connected with the wheels, with a power mechanism transmitting power to the wheels through the transmission mechanism.

7. The field agricultural machinery test platform according to claim 6, wherein: the transmission mechanism comprises a reducer and a sprocket assembly; the sprocket assembly comprises a sprocket shaft, a chain and sprocket teeth, the sprocket teeth being arranged on the sprocket shaft and meshed with the chain; the drive device is connected with the reducer through a belt, and the reducer is connected with the sprocket shaft under a seat, thereby driving the sprocket teeth to rotate; the chain is connected with the sprocket teeth and the wheels, so as to output power to the wheels through the chain and then drive the wheels to rotate.

* * * * *